United States Patent [19]

Munter

[11] 4,154,985
[45] May 15, 1979

[54] INTERFACE CIRCUIT FOR DIGITAL TELEPHONE FACILITIES

[75] Inventor: Ernst A. Munter, Ottawa, Canada

[73] Assignee: Northern Telecom Limited, Montreal, Canada

[21] Appl. No.: 901,136

[22] Filed: Apr. 28, 1978

[51] Int. Cl.² .............................................. H04J 3/06
[52] U.S. Cl. ............................ 179/15 BV; 179/15 BS; 179/15 A
[58] Field of Search ......... 179/15 BV, 15 BS, 15 AT, 179/15 A, 15 AF; 178/69.1

[56] References Cited

U.S. PATENT DOCUMENTS

| 3,692,941 | 9/1972 | Collins et al. | 179/15 BS |
|---|---|---|---|
| 4,006,314 | 2/1977 | Condon et al. | 179/15 BS |

Primary Examiner—Kathleen H. Claffy
Assistant Examiner—Joseph A. Popek
Attorney, Agent, or Firm—Frank Turpin

[57] ABSTRACT

A digital telephone signal interface circuit couples data signal from one digital telephone facility, operating at one data bit rate, to another digital telephone facility operating at another data bit rate. The interface circuit includes a storage system and a frequency converter circuit. The frequency converter circuit includes an analogue frequency converter circuit for multiplying the frequency of a signal applied thereto by a whole number and a digital frequency converter circuit for reducing the frequency of a signal applied thereto by a factor of at least two. The analogue and digital converter circuits are connected in series and generate a second synchronizing signal for the operation of the other digital telephone facility in response to a first synchronizing signal from the one digital telephone facility. The storage system receives data signals from the one digital telephone facility and in response to the second synchronizing signal couples the received data signals to the other digital telephone facility.

11 Claims, 3 Drawing Figures

INTERFACE CIRCUIT FOR DIGITAL TELEPHONE FACILITIES

The present invention relates to digital telephone systems and more particularly to an interface circuit for coupling data in a bit stream having one bit rate to another bit stream having a different bit rate.

Both North American and European digital signal transmission systems were implemented as an alternative to analogue signal transmission systems to provide more economical and reliable toll and truck transmission facilities typically between telephone switching offices. Pulse code modulated (PCM) telephone transmission was pioneered in North America at a time when state of the art technology constrained the parameters of the basic transmission system to those now associated with the well known "T1" system or format. In that system, each time sharing channel of 24 channels includes eight data bits occurring at an 8 KHz rate which dictates a system data bit rate of about 1.544 MHz. Another system was developed to a different standard or format of 32 channels occurring at the 8 KHz rate. This system is now generally used outside of North America.

Although in the past it was more economical to transmit toll signals in a digital form, it was more economical to switch these signals in an analogue form. Hence, before entering the digital transmission system, analogue signals were encoded into the digital form and before entering the receiving switching network, these signals were decoded from the digital form back to their analogue form.

With the development of large scale integrated silicon circuit technology, digital signal switching machines now appear to be more economically attractive than the well established analogue switching machines of the past. Furthermore it has been found that switching machines designed to operate with 32 channels are comparably more hardware efficient than an equivalent machine designed to be compatible with the 24 channel 1.544 MHz format. However, if a 32 channel format machine is to make use of the existing 24 channel 1.544 MHz bit rate transmission facilities, suitable interface circuits are required.

The present invention provides an interface circuit and a method for converting digital signals having a faster bit rate to digital signals having a slower bit rate. A frequency converter generates a synchronizing signal required for transmitting the digital signals at the slower bit rate. The frequency converter uses timing information inherent in the telephone facility operating at the faster bit rate to define the frequency of the slower bit rate.

One prior method for obtaining the synchronizing signal has been to use a phaselock loop circuit. The phaselock loop circuit is preceded by a fixed divider circuit which reduces the frequency of the faster synchronizing signal to the frequency of the PCM sample rate, typically 8 KHz. Another fixed divider circuit reduces the required synchronizing signal frequency at the output of the phaselock loop circuit to about the frequency of the sample rate. These two divided signals are phase compared with the resulting phase error voltage being filtered and fed to the control input of a voltage controlled oscillator in the phaselock loop circuit. The oscillator responds to this error voltage by altering the frequency of oscillation to more closely correspond to the desired frequency of the slower synchronizing signal. In this prior method, difficulties were experienced in deriving the desired tolerance of frequency from the output of the voltage controlled oscillator. As the phase error voltage is obtained from signals of a relatively low frequency the filter must have a correspondingly long time constant. Hence the voltage controlled oscillator must be very sensitive, in order to obtain the required tracking with the error voltage from the filter. Unfortunately this sensitivity to the error voltage is inherently accompanied by high sensitivity to temperature variation and internal noise. This tends to cause the phase of the output signal from the phaselock loop circuit to be unstable and shift or jitter an intolerable amount. This instability is overcome at considerable expense by the use of ultra stable components, and the provision of a temperature stablilized environment.

Another prior method is to generate both synchronization signals for the faster and slower bit rate facilities from a single high frequency source followed by divider circuits. However, the bulk of circuitry required introduces gate delay problems and tends to be relatively expensive.

In accordance with the invention, there is provided a digital telephone signal interface circuit for coupling data signals from a first digital telephone facility to a second digital telephone facility. The first digital telephone facility operates at a first bit rate as defined by a first synchronizing signal generated therein and the second digital telephone facility is operable at a second bit rate different than the first bit rate in response to a second synchronizing signal generated in the interface circuit. The interface circuit comprises a frequency converter in combination with a storage means. The frequency converter is responsive to the pulse repetition frequency of the first synchronizing signal for generating the second synchronizing signal having a pulse repetition frequency corresponding to the second bit rate. The frequency converter includes a digital frequency converter circuit connected in series with an analogue frequency converter circuit. The digital frequency converter circuit generates an output signal having a pulse repetition frequency reduced by a factor of at least two with respect to the frequency of a signal applied thereto, and the analogue frequency converter circuit generates an output signal having a frequency corresponding to a whole number multiple of the frequency of a signal applied thereto. The storage means receives predetermined portions of the data signals from the first digital telephone facility and in response to the second synchronizing signal couples the received data signals to the second digital telephone facility.

In accordance with the invention, there is also provided a method for converting a first synchronizing signal from a first digital telephone facility to a second synchronizing signal for operating a second digital telephone facility. The method comprises the steps of generating a first clock signal in response to the first synchronizing signal, the first clock signal having a pulse repetition frequency corresponding to a whole number multiple of the frequency of the first synchronizing signal. A second clock signal is generated in response to the first clock signal, the second clock signal having a pulse repetition frequency of not more than half the frequency of the first clock signal. The second synchronizing signal is generated in response to the second clock signal, the second synchronizing signal having a frequency corresponding to a whole number multiple of the frequency of the second clock signal.

An example embodiment of the invention will now be described with reference to the accompanying drawings in which.

Figure 1:
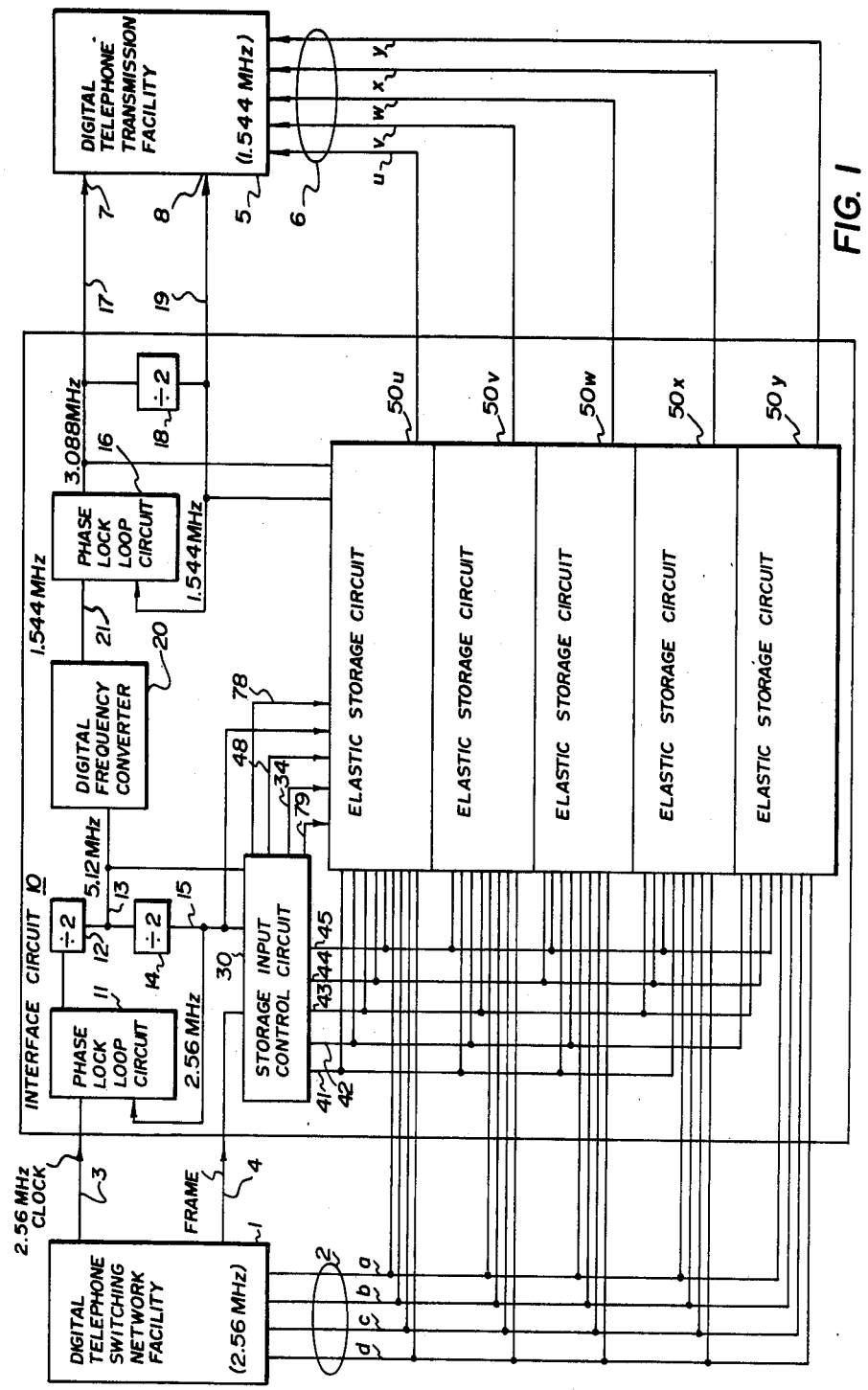
FIG. 1 is a block schematic diagram of an interface circuit connected between two digital telephone facilities operable in different bit rates and formats.

Referring to FIG. 1, a digital telephone switching network facility 1 is operable at a rate of about 2.56 MHz. It provides switching for binary signals, for example in a pulse code modulated (PCM) format of words or bytes of eight information bits, a parity bit and a supervision bit. These words are arranged in frames having space for 32 time multiplexed channels. The frames occur with a repetition rate of about 8 KHz. Words which require transmission to distant network facilities appear on outgoing trunk leads 2 (a, b, c and d). The outgoing trunk leads 2 are connected to an interface circuit 10. The digital telephone switching network facility 1 also supplies a 2.56 MHz first synchronizing signal via a lead 3 and an 8 KHz frame signal via a frame lead 4 to the interface circuit 10.

A digital telephone transmission facility 5 transmits the information appearing on the outgoing trunk leads 2 to a distant telephone network facility (not shown). However, the bit rate capacity of the digital telephone transmission facility 5 is about 1.544 MHz. At the 8 KHz frame repetition rate, 24 eight bit words per frame are transmitted. The digital telephone transmission facility 5 receives words at the lower 1.544 MHz bit rate, time multiplexed with 24 channels per frame from the interface circuit 10, on outgoing trunk leads 6 (u,v,w,x and y). The digital telephone transmission facility 5 also receives 3.088 MHz clock signals at an input 7 and 1.544 MHz clock signals at an input 8 from the interface circuit 10 via leads 17 and 19 respectively. These clock signals are utilized by the digital telephone transmission facility 5, for example, to facilitate transmission in the well known bipolar format.

The interface circuit 10 includes a first analogue frequency converter circuit in the form of a phaselock loop circuit 11 having an input connected to the lead 3 and an output connected to a feedback loop. The feedback loop includes a divide by two circuit 12 and a divide by two circuit 14. The divide by two circuit 12 has an output connected to an input of the divide by two circuit 14 and to the input of a digital frequency converter 20, via a lead 13. An output of the divide by two circuit 14 is connected to an error input of the phaselock loop circuit 11 via a lead 15. An output 21 of the digital frequency converter 20 is connected to an input of a second analogue frequency converter circuit in the form of a phaselock loop circuit 16. An output of the phaselock loop circuit 16 is connected to a feedback loop, via the lead 17. The feedback loop includes a divide by two circuit 18 which is connected to an error input of the phaselock loop circuit 16, via the lead 19. The construction of both the phaselock loop circuits 11 and 16 is well known and may be accomplished with off-the-shelf components. Each of the phaselock loop circuits typically includes a phase comparator which compares the signals between the input and the error input to generate an error voltage. This error voltage is filtered and thereafter used to control the frequency of a voltage controlled oscillator which generates the required frequency at the output of the phaselock loop circuit. It should be noted that there is relatively little reduction of frequency in the feedback loops between each output and error input of the phaselock loop circuits 11 and 16 and hence no special techniques or design considerations are needed to obtain acceptably stable performance from these circuits.

The phaselock loop circuit 11 receives the first synchronizing signal and generates therefrom a 10.24 MHz signal which is divided in the divide by two circuit 12 to produce a 5.12 MHz first clock signal on the lead 13. The divide by two circuit 14 divides the 5.12 MHz clock signal to produce a 2.56 MHz reference signal on the lead 15. The digital frequency converter 20 receives the first clock signal on the lead 13 and generates therefrom a 1.544 MHz second clock signal. The phaselock loop circuit 16 receives the second clock signal from the digital frequency converter 20 and generates therefrom a 3.088 MHz signal on the lead 17. The divide by two circuit 18 divides the 3.088 MHz signal to produce a 1.544 MHz second synchronizing signal on the lead 19.

Figure 2:
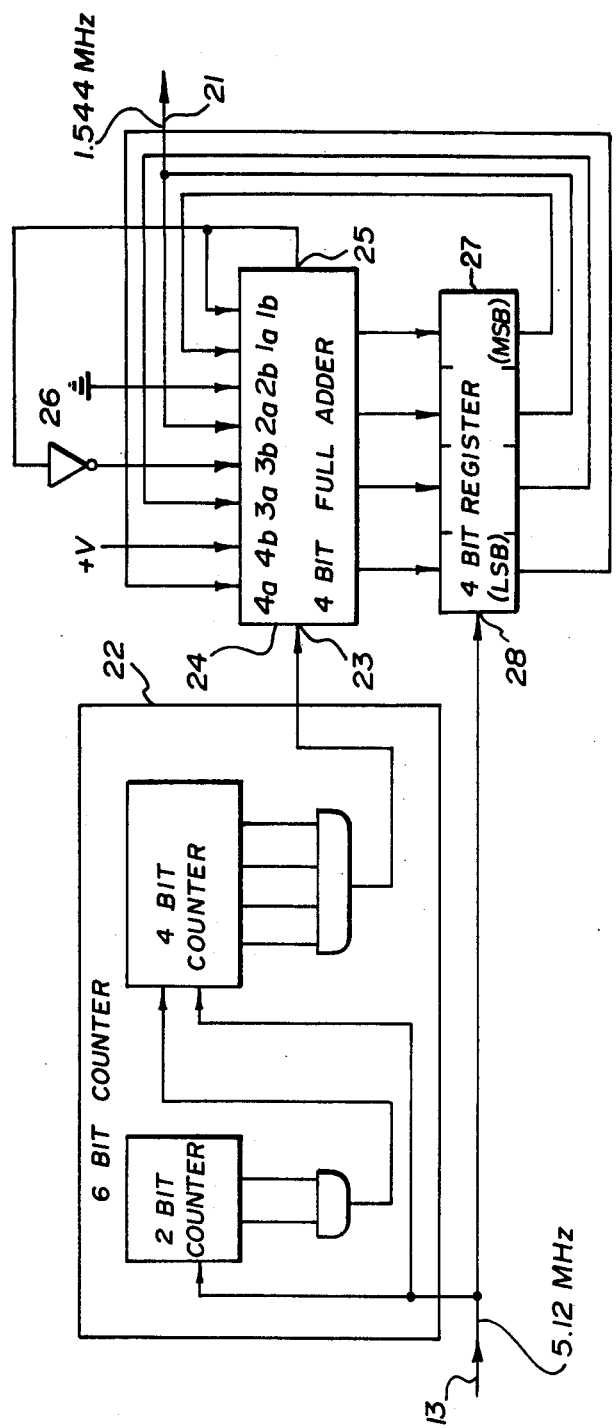
FIG. 2 is a block schematic diagram of a digital frequency converter used in the interface circuit illustrated in FIG. 1.

The digital frequency converter 20 is essential to the function of converting the 2.56 MHz first synchronizing signal to the 1.544 MHz second synchronizing signal. Referring to FIG. 2, the digital frequency converter 20 includes a six bit counter 22 having an input connected to the lead 13 and a carry output connected to an input 23 of a four bit full adder 24. The adder 24 includes four outputs connected to four inputs of a four bit register 27, in which the most significant bit (MSB) position is to the right and the least significant bit (LSB) position is to the left. Outputs from the bit position MSB through LSB are connected to inputs of corresponding significance $1a$ through $4a$ respectively of the adder 24. The adder 24 includes a carry or overflow output 25 which is connected to an input $1b$ and via an inverting amplifier 26 to an input $3b$. Inputs $2b$ and $4b$ of the adder are connected to ground and a positive voltage $+V$ respectively. The adder 24 and the register 27 in combination provide an accumulator function to generate in combination with the counter 22 the second clock signal of a frequency of 136/640 of the frequency of the first clock signal. A clock input 28 of the register 27 receives the 5.12 MHz first clock signal on the lead 13. Each pulse of this clock signal causes the contents of the register 27 to be applied to the inputs $1a$-$4a$ of the adder 24. The states of the inputs $1a$-$4a$ are added to the states of the inputs $1b$-$4b$, with the resultant being registered in the register 27. In this particular configuration, each occurrence of the clock pulse on the lead 13 causes an accumulation of three to occur in the register 27. With every sixty-fourth occurrence of a clock pulse on the lead 13, the output of the six bit counter is asserted and in this case an accumulation of four instead of three occurs. When the sum accumulated would have exceeded the range of the register 27, the overflow output 25 is asserted and causes an accumulation of nine instead of three to occur. In the case where both the carry input 23 and the overflow output 25 are asserted an accumulation of ten instead of four or three occurs. This has the effect of generating the second clock signal having a pulse repetition rate of 1.544 MHz at the second most significant output lead of the register 27.

The phase jitter of the second clock signal is no more than half the period of the applied input signal, in this case, the 5.12 MHz clock signal. It should be noted that although the jitter in the second clock signal may be relatively insignificant in may digital circuit applications, it is preferable to substantially eliminate this jitter in the case where the signal is to be used as a precise synchronizing signal as in the example embodiment. In FIG. 1, this jitter is substantially removed by the phase-lock loop circuit 16, however an alternate structure of the digital frequency converter would permit the use of a higher frequency first clock signal with an attendant reduction of the jitter in the resulting second clock signal.

Referring again to FIG. 1, the outgoing trunk leads 2 are connected to each of five elastic storage circuits 50u through 50y, the outputs of which are connected to the outgoing trunk leads 6; u, v, w, x and y respectively. The frame lead 4 is connected to an input of a storage input control circuit 30. The leads 15 and 13 are also connected to the storage input control circuit 30. The storage input control circuit 30 generates selection control signals on output leads 41, 42, 43, 44 and 45, which are selectively connected to the elastic storage circuits 50 as shown in table A.

TABLE A

| Elastic Storage Circuit | Storage Input Control Circuit, Output Leads |
|---|---|
| 50u | 41, 42, 43, 44 |
| 50v | 41, 42, 43, 45 |
| 50w | 41, 42, 44, 45 |
| 50x | 41, 43, 44, 45 |
| 50y | 42, 43, 44, 45 |

The storage input control circuit also generates byte window and bit timing signals on lead 34 and 48 respectively. The leads 34, 48, 15, 17 and 19 for convenience are shown as connected to the top of the elastic storage circuit 50u, however it should be understood that these leads are connected across all the elastic storage circuits 50u–50y. In operation the elastic storage circuits transfer selected information bits from the 320 (32×10) bit frames appearing on the outgoing trunk leads 2A–2D to the five outgoing trunk leads 6u–6y, in a 193 (24×8+1) bit frame.

The elastic storage circuits and the storage input control circuit are described in more detail with reference to FIG. 3. In the storage input control circuit 30, a decade counter 31 includes a clock input 33 for receiving the 2.56 MHz reference signal on the lead 15 and a reset input 32 for receiving frame pulses from a NAND gate 46. The decade counter 31 provides count outputs Q1–Q4 and a carry output 35 which is connected to the input of an eight bit binary counter 36. The eight bit binary counter 36 has a clock input 38 connected to the lead 15 and a reset input 37 connected to the output of the NAND gate 46. A bus 39 connects output of the eight bit binary counter 36 to a decode circuit 40 having outputs connected to the leads 41–45. A D-type flip flop 47 includes an input D connected to the lead 15, a clock input CK connected to the lead 13 and an output Q connected to a lead 48.

In operation, the NAND gate 46 generates a reset pulse with the occurrence of a frame pulse on the lead 4 coincident with a clock pulse on the lead 15. The reset pulse initializes both the decade counter 31 and the eight bit binary counter 36. The decade counter 31 counts the clock signals appearing at the clock input 32 to generate the byte window signal with a period of eight clock pulses, that is about 3.12 microseconds. When the decade counter 31 reaches a count of ten, it generates a carry pulse at the carry output 35 and resets to begin counting again. The eight bit binary counter 36 counts carry pulses from the decade counter and provides the result on the bus 39. The counter 36 is reset with each occurrence of a reset pulse from the NAND gate 46 and in counting is synchronized with the clock signals on the lead 15. The decode circuit 40 decodes the output of the eight bit binary counter 36 to generate selection control signals which are mutually exclusive in occurrence on the leads 41–45. The D-type flip flop 47 generates write control signals shifted 90° from the leading edge of the clock pulses on the lead 15 and having a pulse width of about 96 nanoseconds.

Figure 3:
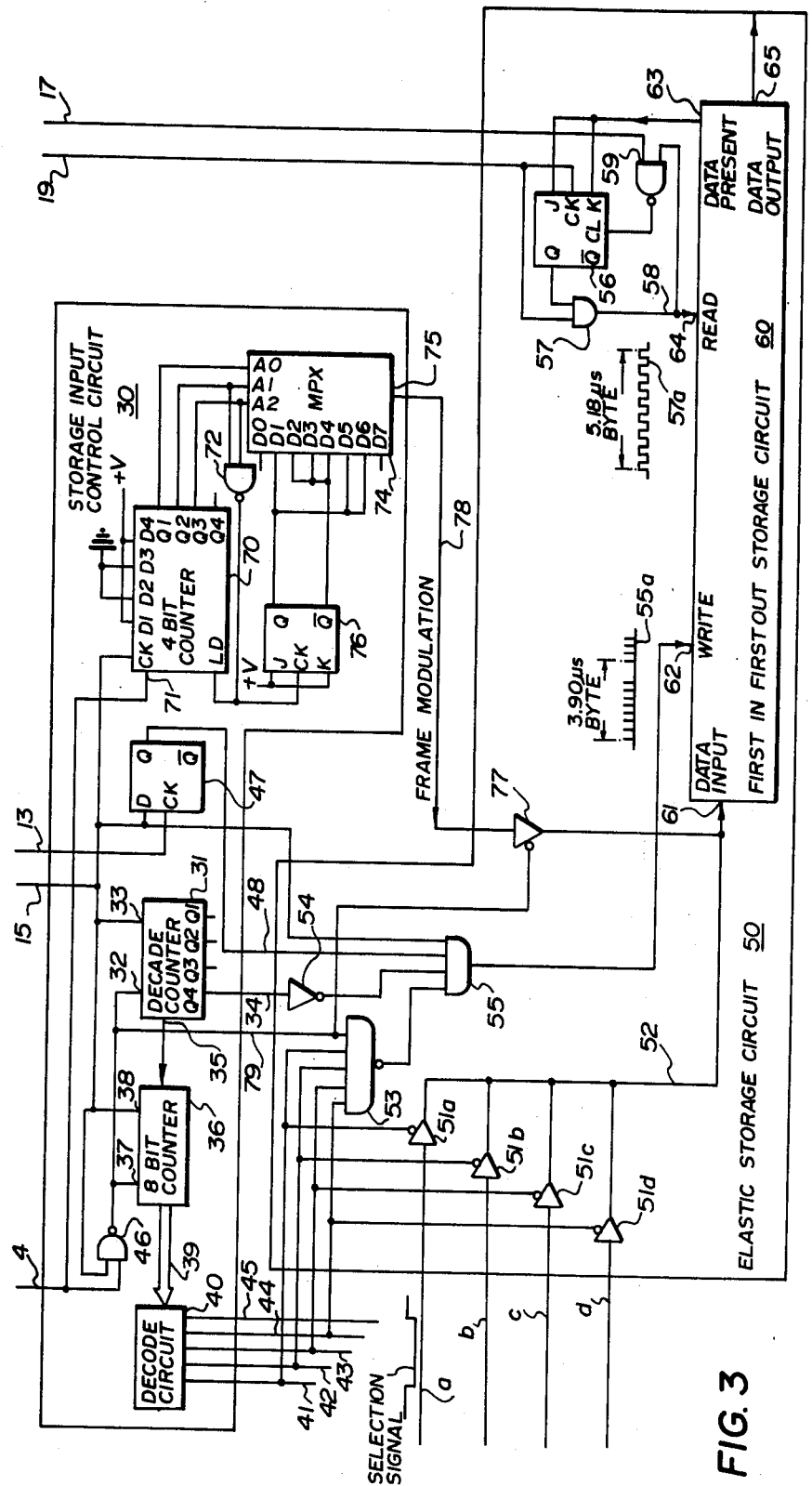
FIG. 3 is a block schematic diagram of an elastic storage circuit and a storage input control circuit used in the interface circuit illustrated in FIG. 1.

The elastic storage circuit 50 in FIG. 3 is representative of each of the elastic storage circuits 50u–50y in FIG. 1. Each elastic storage circuit includes input transmission gates 51a–51d, write control circuitry having a NAND gate 53, an inverter 54 and an AND gate 55, and read control circuitry having a JK flip flop 56, and AND gate 57 and a NAND gate 59. A first in, first out storage circuit 60, has an input 61 connected to the outputs of the transmission gates 51a–51d via an input data lead 52, and a data output 65 which comprises an output of the elastic storage circuit 50. A write input 62 is connected to the output of the AND gate 55, and a read input 64 is connected to the output of the AND gate 57. A data present output 63 is connected to the J and K inputs of the JK flip flop 56.

In operation of the elastic storage circuit 50, a selection control signal on one of the leads 41–45 causes the associated transmission gate 51 to transmit the state of the associated outgoing trunk lead 2 to the data input 52. Simultaneously, the AND gate 55 is enabled via the NAND gate 53. The 3.21 microsecond byte window signal from the decade counter 31 is transmitted to the AND gate 55 via the inverter 54. The reference signals on the lead 15 each defines a period during which valid input data is present on the input date lead 52. A write control signal from flip flop 47 appears on the lead 48 and in combination with the enable, byte window and reference signal, generates at the output of the AND gate 55, bursts of write signals similar to that illustrated by a waveform 55a. The storage circuit 60 responds to each write signal by storing the state of the input data lead 52. These stored information bits proceed toward the output 65 of the storage circuit 60 and when the last stage of the storage circuit 60 adjacent the output 64 becomes occupied by an information bit a data present signal is generated at the data present output 63. The 1.544 MHz synchronization signal appears on the lead 19 in combination with a data present signal to cause the JK flip flop 56 and the AND gate 57 to generate a read signal which is applied to the read input 64. Each read signal is terminated upon the occurrence of a positive edge in the 3.088 MHz signal appearing on the lead 17. In the presence of a read signal this signal causes the output of the NAND gate 59 to be asserted to clear the flip flop 56. Typical read signals are illustrated by the waveform 57a. An information bit is coupled from the last stage of the storage circuit 60 to an associated one of the outgoing trunk lines 6 with the occurrence of each read signal.

It is seen from comparing the waveforms 55a and 57a that during the period of 3.9 microseconds a byte of eight information bits is written into the storage circuit 60 while it requires about 5.2 microseconds for a byte of information to be read out of the storage circuit 60. To prevent the storage circuit 60 from becoming totally filled, it is inhibited at the input fom time to time so that in a space of one frame it can receive and transmit only 24 of the 32 word appearances at the 8 KHz frame rate. A suitable input-output sequence is illustrated in the following table B in which it will be noticed that channels 0 and 16 are not transmitted. This is because only 30 of the channels are used for voice transmission whereas the other two channels are used as signalling channels within the telephone facility 1.

TABLE B

| PCM CHANNEL number | TRUCK LEAD FROM WHICH EACH ELASTIC STORAGE CIRCUIT IS ENABLED TO WRITE | | | | |
|---|---|---|---|---|---|
| | 50u | 50v | 50w | 50x | 50y |
| 0 | — | — | — | — | — |
| 1 | a | b | c | d | — |
| 2 | b | c | d | — | a |
| 3 | c | d | — | a | b |
| 4 | d | — | a | b | c |
| 5 | — | a | b | c | d |
| 6 | a | b | c | d | — |
| 7 | b | c | d | — | a |
| 8 | c | d | — | a | b |
| 9 | d | — | a | b | c |
| 10 | — | a | b | c | d |
| 11 | a | b | c | d | — |
| 12 | b | c | d | — | a |
| 13 | c | d | — | a | b |
| 14 | d | — | a | b | c |
| 15 | — | a | b | c | d |
| 16 | — | — | — | — | — |
| 17 | a | b | c | d | — |
| 18 | b | c | d | — | a |
| 19 | c | d | — | a | b |
| 20 | d | — | a | b | c |
| 21 | — | a | b | c | d |
| 22 | a | b | c | d | — |
| 23 | b | c | d | — | a |
| 24 | c | d | — | a | b |
| 25 | D | — | a | b | c |
| 26 | — | a | b | c | d |
| 27 | a | b | c | d | — |
| 28 | b | c | d | — | a |
| 29 | c | d | — | a | b |
| 30 | d | — | a | b | c |
| 31 | — | a | b | c | d |

In the T1 format of digital transmission there are 193 bits per frame. According to the above table, 24×8, i.e. 192 bits are transferred onto each of the outgoing trunk leads 6u–6g during each frame. In the T1 format, the 193rd bit is a frame bit which, over a period of twelve frames, is required to follow a standard pattern (i.e. 1 0 0 0 1 1 0 1 1 1 0 0). The required frame bit is periodically supplied to the first in, first out storage circuit 60 via a transmission gate 77 having an output connected to the data input 61. The occurrence of a frame signal on the lead 4 causes the NAND gate 53 and the transmission gate 77 to be enabled, and a write signal to be supplied to the write input 62 via the AND gate 55. The state of the frame modulation lead 78 is thus stored in the first in first out storage circuit 60 with the occurrence of each 193rd write signal at the write input 62.

The state of the frame modulation lead is determined by a frame modulation signal which is generated in combination by a four bit counter 70, a NAND gate 72, a multiplexer 74, and a JK flip flop 76. The 4 bit counter 70 includes a clock input CK connected to the lead 15, a load input LD, four data inputs D1–D4 and four outputs Q1–Q4, three of which Q1–Q3 are used. The multiplexer 74 includes three address inputs A0–A2 connected to the three outputs Q1–Q3 respectively, eight data inputs D0–D7, and an output 75 connected to the frame modulation lead 78. The JK flip flop 76 includes a clock input CK, inputs J and K connected to +V along with the data inputs D0–D7 of the multiplexer 74, and Q and $\overline{Q}$ outputs connected to the data inputs D1, D5 and D6, and the data inputs D2, D3 and D4 respectively of the multiplexer 74. The NAND gate 72 includes two inputs connected to the outputs Q2 and Q3 of the 4 bit counter and an output connected to the clock input CK of the flip flop 76 and the load input LD of the four bit counter 70.

In operation, the four bit counter counts frame signals appearing at the input 71. When the outputs Q1–Q3 of the four bit counter become binary six, the output of the NAND gate 72 is asserted, causing the four bit counter to be loaded with the states of the data inputs D1–D4, (i.e. 1 0 0 1) commensurate with the next pulse at the input CK. Thus the four bit counter 70 is effectively caused to count between binary nine and binary fourteen to yield an address range of one to six at its outputs Q1–Q3. Each assertion of the output of the NAND gate 72 also causes the JK flip flop 76 to toggle. The multiplexer 74 is controlled by the addresses (1–6) appearing at its inputs A0–A2 to generate the frame modulation signal by selecting the corresponding ones of its data inputs D1–D6 and transferring the state of the selected data input to the frame modulation lead 78 via the output 75. As the states of the data inputs D1–D6 are changed with each toggle of the JK flip flop 76, the frame modulation signal comprises a series of six frame modulation pulses which are the complement of the preceding series of six frame modulation pulses.

It should be noted that some of the circuit elements, for example elements 36 and 70, may just as well be provided by elements of a more limited function than those specified. The specified elements were selected as these are currently available as "off-the-shelf" items. In the storage circuit the use of either random access memory components or first in first out (FIFO) memory components is envisaged. Numerous circuit modifications in the example embodiment for example to take optimal advantage of integrated circuit prices and supply will be obvious to persons skilled in the art.

In the foregoing, the interface circuit has been described as operating with digital facilities having 2.56 MHz and 1.544 MHz bit rates. However the principles of construction and operation of the interface circuit can be used to provide interface circuits suitable for use between facilities having other operating bit rates without departing from the scope of the invention.

Considering a case where an interface circuit is required between facilities operable at bit rates of 2.56 MHz and 1.288 MHz, some modifications are required in the previously described interface circuit. For example in the frequency converter the six bit counter 22 is replaced by an eight bit counter, arranged to count from 96. The four bit adder 24 is replaced by a two bit adder and the four bit register 27 is replaced by a two bit register. The inputs 1b and 2b of the adder are connected to +V and ground respectively. The second clock signal is obtained from the most significant bit (MSB) of the two bit register. Of course, some modification of the storage arrangements is also required as in this case the four trunk leads from the faster facility are advantageously interfaced with six trunk leads instead of the five trunk leads in the example embodiment.

In another example, digital data signals from a first facility operating at 1.544 MHz can be coupled to a second facility operable at 2.56 MHz. In this case the first phaselock loop circuit is arranged to multiply the synchronizing signal from the slower facility by two. The digital frequency converter is arranged to receive the resulting 3.088 MHz signal and change it to a 1.280 MHz signal. The second phaselock loop circuit is arranged to multiply the 1.280 MHz signal by four to generate a 5.120 MHz signal for synchronizing the second facility.

What is claimed is:

1. A digital telephone signal interface circuit for coupling data signals from a first digital telephone facility to a second digital telephone facility, said first digital telephone facility operating at a first bit rate as defined by a first synchronizing signal from the first digital telephone facility and at a frame rate as defined by a frame signal from the first digital telephone facility, and said second digital telephone facility operable at a second bit rate different than said first bit rate in response to a second synchronizing signal from the interface circuit, the interface circuit comprising:
   a frequency converter means for connection between the first and second digital telephone facilities and responsive to the pulse repetition frequency of the first synchronizing signal for generating the second synchronizing signal having a pulse repetition frequency corresponding to said second bit rate, the frequency converter means including a digital frequency converter circuit for generating an output signal having a pulse repetition frequency reduced by a factor of at least two with respect to the frequency of a signal applied thereto, the digital frequency converter circuit being connected in series with an analogue frequency converter circuit for generating an output signal having a frequency corresponding to a whole number multiple of the frequency of a signal applied thereto; and
   storage means for connection between the first and second digital telephone facilities, the storage means being responsive to said second synchronizing signal for coupling data signals from the first digital telephone facility to the second digital telephone facility.

2. An interface circuit as defined in claim 1 wherein the storage means receives the data signals from the first digital telephone facility via a plurality of first trunk leads, and in which the storage means comprises:
   a storage input control circuit for generating selection control signals in response to the first synchronizing signal; and
   an input means responsive to the selection control signals for receiving the data signals from one of the leads of the plurality of the first trunk leads.

3. An interface circuit as defined in claim 1 in which the frequency converter means includes first and second analogue frequency converter circuits comprising first and second phaselock loop circuits respectively, the first phaselock loop circuit being responsive to the first synchronizing signal for generating a first clock signal, the digital frequency converter circuit being responsive to the first clock signal for generating a second clock signal, and the second phaselock loop circuit being responsive to the second clock signal for generating the second synchronizing signal.

4. An interface circuit as defined in claim 1 in which the digital frequency converter circuit comprises:
   means responsive to the applied signal for generating signal pulses each signifying the passage of an interval of time corresponding to a predetermined whole number multiple of the period of the applied signal;
   an accumulator circuit, including an adder circuit in combination with a register circuit, the adder circuit including a plurality of inputs, a carry input for receiving the signal pulses and an overflow output, at least one of the plurality of inputs being connected to the overflow output and the remainder of the plurality of inputs each being connected to have a permanent binary signal state, the register circuit having a predetermined number of stages each for registering a binary singal from the adder circuit, the register circuit being responsive to the applied signal for coupling the registered binary signals to the adder circuit;
   whereby one of the registered binary signals so coupled is the output signal of the digital frequency converter circuit.

5. In an interface circuit as defined in claim 1, means responsive to the frame signal from the first digital telephone facility for generating a framing signal having a predetermined sequence and for interleaving the framing signal with the predetermined portions of the data signals.

6. An interface circuit as defined in claim 3 in which the digital frequency converter circuit comprises:
   means responsive to the first clock signal for generating signal pulses each signifying the passage of an interval of time corresponding to a predetermined whole number multiple of the period of the first clock signal;
   an accumulator circuit including an adder circuit in combination with a register circuit, the adder circuit including a plurality of inputs, a carry input for receiving the signal pulses and an overflow output, at least one of the plurality of inputs being connected to the overflow output and the remainder of the plurality of inputs each being connected to have a permanent binary signal state, the register circuit having a predetermined number of stages each for registering a binary signal from the adder circuit, the register circuit being responsive to the applied signal for coupling the registered binary signals to the adder circuit;
   whereby one of the registered binary signals so coupled is the second clock signal.

7. A digital telephone signal interface circuit for coupling data signals from a plurality of first trunk leads associated with a first digital telephone facility to a second plurality of trunk leads associated with a second digital telephone facility, the first digital telephone facility operating at a first data bit rate as defined by a first synchronizing signal from the first digital telephone facility and having a predetermined pulse repetition frequency, and the first digital telephone facility operating at a frame rate as defined by a frame signal from the first digital telephone facility, the second digital telephone facility operable at a second data bit rate in response to a second synchronizing signal from the interface circuit and having a pulse repetition frequency of less than said predetermined pulse repetition frequency, the digital telephone interface circuit comprising:
   a first phaselock loop circuit responsive to the first synchronizing signal for generating a first clock signal having a pulse repetition frequency a whole number multiple of at least twice the pulse frequency of the first synchronizing signal;

a digital frequency converter circuit responsive to the first clock signal for generating a second clock signal having a pulse repetition frequency of less than half of the pulse repetition frequency of the first clock signal;

a second phaselock loop circuit responsive to the second clock signal for generating a second synchronizing signal corresponding in frequency to the pulse repetition frequency of the second clock signal.

a storage means connected between the pluralities of the first and second trunk leads, and responsive to the first clock signal, for receiving predetermined portions of the data signals from the first trunk leads, and responsive to the second synchronizing signal for coupling the received data signals to the second trunk leads.

8. An interface circuit as defined in claim 7 in which the second data bit rate is 193/320 of the first data bit rate, the digital frequency converter circuit comprising:

a modulo 64 counter having a carry output, the counter being responsive to the first clock signal for generating a signal pulse at the carry output simultaneously with the occurrence of each sixty-fourth pulse of the first clock signal;

an accumulator circuit having a 4 bit adder, a 4 bit register and an inverter circuit, the 4 bit adder having first and second groups of four inputs ranked in order of significance, a carry input and a carry output, the fourth most significant and the second most significant of the four inputs of the first group being connected to power and ground respectively, the carry output being connected to the most significant of the four inputs of the first group, the inverter circuit being connected between the carry output of the adder and the third most significant of the four inputs of the first group, the carry input of the adder being connected to the carry output of the modulo 64 counter, the register having four outputs connected to corresponding ones of the four inputs of the second group, the accumulator being responsive to each pulse of the first clock signal for accumulating three when neither carry is asserted, for accumulating four instead of three when the carry output of the modulo 64 counter is asserted, for accumulating nine instead of three when the carry output of the adder is asserted and for accumulating ten instead of three or four when both carry outputs are asserted;

whereby said second clock signal is obtained at the second most significant output of the four outputs of the register.

9. An interface circuit as defined in claim 7 further comprising:

in the first phaselock loop circuit, a divider circuit for generating a reference signal substantially corresponding to the first synchronizing signal, in response to the first clock signal; and in the storage means, a storage input control circuit and a plurality of elastic storage circuits;

the storage input control circuit comprising:

means for generating byte window signals of a predetermined length in response to the reference signal and the frame signal;

means responsive to the first clock signal and the reference signal for generating write signals during the assertion of each byte window signal and for generating a single write signal in response to each occurrence of the frame signal;

means for generating selection control signals in response to the byte window signals; and means for generating a frame modulation signal having a predetermined pattern in response to the frame signal from the telephone facility;

the elastic storage circuits each comprising:

a storage circuit having a write input connected to the write signal generating means, a read output for connection to a respective one of the second trunk leads and an input, each storage circuit being responsive to the second synchronizing signal for sequentially coupling data bits stored therein to the second trunk lead via the read output and being responsive to each write signal to store the binary state of its input;

a plurality of transmission gates each having an output connected to the input of the storage circuit and an input for connection to a respective one of the first trunk leads, each transmission gate connected to the selection control signal generating means and being responsive to a predetermined selection control signal for coupling the data signals from said respective one of the first trunk leads to the input of the storage device; and gating means connected between the frame modulation signal generating means and the input of the storage device for coupling a framing signal thereto corresponding to the state of the frame modulation signal in response to each occurrence of the frame signal.

10. In a digital telephone system having an interface circuit for coupling data signals between a first digital telephone facility operable at a data bit rate as defined by a first synchronizing signal, and a second digital telephone facility operating at a data bit rate as defined by the frequency of a second synchronizing signal, a method for generating the second synchronizing signal from the first synchronizing signal, the method comprising the steps of:

(a) generating a first clock signal in response to the first synchronizing signal, the first clock signal having a frequency corresponding to a whole number multiple of the frequency of the first synchronizing signal, (b) generating a second clock signal in response to the first clock signal, the second clock signal having a pulse repetition frequency of not more than half the frequency of the first clock signal, (c) generating the second synchronizing signal in response to the second clock signal, the second synchronizing signal having a frequency corresponding to a whole number multiple of the frequency of the second clock signal.

11. A method as defined in claim 10 comprising the additional steps of:

(d) receiving predetermined portions of the data signals from the first digital telephone facility in response to the first clock signals, and (e) coupling the received data signals to the second digital telephone facility in response to the second synchronizing signal.

* * * * *